United States Patent
Pruett et al.

(10) Patent No.: US 6,490,121 B1
(45) Date of Patent: Dec. 3, 2002

(54) ACCELERATED SERVO CONTROL CALCULATIONS METHOD AND APPARATUS FOR A DISC DRIVE

(75) Inventors: David C. Pruett, Allen, TX (US); Travis E. Ell, Austin, TX (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/698,914

(22) Filed: Oct. 27, 2000

Related U.S. Application Data
(60) Provisional application No. 60/193,683, filed on Mar. 31, 2000.

(51) Int. Cl.[7] .............................................. G11B 5/596
(52) U.S. Cl. .............................. 360/78.09; 360/77.01; 360/78.05; 360/78.07
(58) Field of Search ................... 360/78.05, 78.06, 360/78.07, 78.09, 78.12, 78.14, 77.01, 77.02, 77.04; 318/560, 561

(56) References Cited

U.S. PATENT DOCUMENTS

| | | | |
|---|---|---|---|
| 5,630,153 A | | 5/1997 | Intrater et al. |
| 5,638,230 A | | 6/1997 | Kadlec |
| 5,640,286 A | * | 6/1997 | Acosta et al. .................. 360/48 |
| 5,805,140 A | | 9/1998 | Rosenberg et al. |
| 5,898,286 A | | 4/1999 | Clare et al. |
| 6,050,718 A | | 4/2000 | Schena et al. |
| 6,064,540 A | * | 5/2000 | Huang et al. .................. 360/75 |
| 6,067,077 A | | 5/2000 | Martin et al. |
| 6,088,019 A | | 7/2000 | Rosenberg |

OTHER PUBLICATIONS

US 5,903,456, 5/1999, Schena et al. (withdrawn).

* cited by examiner

*Primary Examiner*—David Hudspeth
*Assistant Examiner*—Mitchell Slavitt
(74) *Attorney, Agent, or Firm*—Fellers, Snider, et al.

(57) ABSTRACT

Apparatus and method which provide accelerated servo control value calculations for a control processor controlling an actuator maintaining a head adjacent a rotatable disc f a disc drive. A dedicated multiply-accumulate hardware core of a servo micro engine calculates sum-of-products terms common in servo control loops. The multiply-accumulate hardware core uses a pipeline with stages for fetch, read, multiply, accumulate, and write-back as an arithmetic core to fully utilize all of the hardware during every servo interval. Feeding this arithmetic core is a dedicated state memory, from which a first signed servo state and a second signed servo state are read and where calculation results may be optionally written. Another, independent, coefficient memory provides predetermined coefficients used in resolving servo control loop algorithms. A final dedicated instruction memory provides shifter control values and the addresses of the states and coefficients.

22 Claims, 4 Drawing Sheets

ACCELERATED SERVO CONTROL CALCULATIONS METHOD AND APPARATUS FOR A DISC DRIVE

RELATED APPLICATIONS

This application claims priority to United States Provisional Application No. 60/193,683 filed Mar. 31, 2000 entitled Method for Accelerating Servo Control Calculations In Hardware.

FIELD OF THE INVENTION

This invention relates generally to the field of magnetic data storage devices, and more particularly, but not by way of limitation, to an apparatus and method for accelerating servo control calculations of an actuator for a disc drive.

BACKGROUND

Disc drives are used as primary data storage devices in modern computer systems and networks. A typical disc drive comprises a head-disc assembly (HDA) which houses mechanical portions of the drive, and a printed circuit board (PCB) mounted to an outer surface of the HDA which supports electronic circuitry used to control the HDA.

Typically, an HDA comprises one or more magnetic discs that are affixed to and rotated by a spindle motor at a constant high speed and an actuator assembly, which supports an array of heads adjacent tracks defined on the disc surfaces. The surface of each disc is a data recording surface divided into a series of generally concentric recording tracks radially spaced across a band having an inner diameter and an outer diameter. The data tracks extend around the disc and store data within the tracks on the disc surfaces in the form of magnetic flux transitions. The flux transitions are induced by an array of transducers, otherwise commonly called read/write heads or heads. Typically, each data track is divided into a number of data sectors that store fixed sized data blocks.

The head includes an interactive element such as a magnetic transducer, which senses the magnetic transitions on a selected data track to read the data stored on the track. Alternatively. the head transmits an electrical signal that induces magnetic transitions on the selected data track to write data to the track. As is known in the art, each read/write head is mounted to a rotary actuator arm and is selectively positionable by the actuator arm over a selected data track of the disc to either read data from or write data to the selected data track. Each head includes a slider assembly with an air-bearing surface that causes the read/write head to fly above the disc surface. The air bearing is developed as a result of load forces applied to the read/write head by a load arm interacting with air currents that are produced by rotation of the disc.

An actuator motor, such as a voice coil motor (VCM), rotates the actuator assembly, and hence the heads, across the disc surfaces. The control circuitry on the PCB includes a read/write channel which interfaces with the heads to transfer data between the tracks and a host computer, and a servo control system which drives the VCM to provide head positional control, based on the information contained in the servo field.

Continued demand for disc drives with ever increasing levels of data storage capacity and data throughput have led disc drive manufacturers to seek ways to increase the storage capacity of each disc surface and improve operating efficiencies of the disc drive. High performance disc drives of the present generation typically achieve areal bit densities measured in several gigabits per square centimeter, Gbits/$cm^2$. Higher recording densities can be achieved by increasing the number of bits stored along each track, and/or by increasing the number of tracks per unit width across each disc. Storing more bits along each track generally requires improvements in the read/write channel electronics to enable the data to be written (and subsequently read) at a correspondingly higher frequency. Providing higher track densities generally requires improvements in the servo control system to enable the heads to be more precisely positioned over the discs. Improved operating efficiencies or throughput performance, for any given bit density, results from reduced cycle times in performing functions or through elimination and/or incorporation of functions internal to each other.

Throughput performance is enhanced during read/write cycles by stabilizing the servo systems ability to hold the head on track under adverse conditions such as an occurrence of: servo field thermal asperity; rotational vibration; resonance of rigid bodies at frequencies sympathetic to the servo frequencies; or components of runout, velocity and acceleration (commonly referred to as RVA) drifting out of tolerance.

To improve on track performance and improved short seek performance for disc drives of higher track densities, manufacturers of disc drives have expanded both the types of servo strategies employed and the complexity involved with those strategies. As a result, performing calculations for the servo control in high-performance disc drives requires an ever-increasing amount of processing horsepower. As a frame rates and track densities continue to increase, the demand for processing power also increases. This continual need for more MIPS (millions of instructions per second) necessitates rapid turning of the design to obtain an ever-faster processor and places pressure on an organization's development resources.

While improvements in a drive's servo system performance have been made by incorporating servo response enhancements, requirements for calculation of servo task specific algorithms commensurate with those strategies have grown in complexity, frequency and multiplicity. However, implementation of complex servo strategies for cutting-edge high performance disc drives has been limited by processor processing speeds. Servo response enhancements such as: notch filters; single and dual stage observers; state variable feedback control; H-infinity; H-infinity with anti-windup; single and dual stage seamless servo controllers have been developed and implemented to facilitate ever increasing track densities. Adaptation of those strategies into disc drives necessarily includes requirements for calculation of servo specific algorithms commensurate with those strategies. Examples of the types of processor intensive servo specific algorithms include: velocity profiled generation; single and dual-stage model reference seeks; once and twice around calculations; 10-tap RV feed-forward; and calculations of piezo plant voltage values and differences.

Implementation of any given servo enhancement technique, coupled with its appropriate servo specific algorithm, typically placed burdens on the processor that are well within the service capabilities of the processor. However, the demand on processor calculation resources that accompany simultaneous inclusion of a number of servo enhancement techniques, taxes the ability of processor to service both the servo system and non-servo system requirements placed on processor by a disc drive. As such, challenges remain and a need persists for the capability of performing servo calculations fast enough to sustain the processing requirements for several drive generations.

SUMMARY OF THE INVENTION

The present invention provides an apparatus for and method of accelerating calculations of servo control loop values for expanding control processor utility in improving data transfer throughput performance by resolving resource impeded, control processor embedded, multiply-accumulate hardware.

In accordance with preferred embodiments, a disc drive is provided with a rotatable actuator which supports an array of read/write heads adjacent a corresponding number of recording surfaces in a rotatable disc stack. A control processor providing closed loop servo control of the rotatable actuator and a multiply-accumulate hardware core of a micro servo engine providing servo control loop values to the control processor within one clock cycle of the disc drive for carrying out seek and track following control modes of a rotatable actuator.

In a preferred embodiment the actuator is characterized as a dual-stage actuator having both a primary actuator motor (VCM), which controllably moves all heads simultaneously, and an array of secondary microactuator motors which controllably move each head individually. The servo control loop values for the motor or motors are determined in relation to an actual position signal for the head, a desired position signal or target track seek request from the control processor and a set of control limits. The control limits are developed by measuring voltage output responses for each microactuator in response to voltage inputs applied to the individual microactuators and seek performance of the actuator during the manufacturing process. The use of a different set of control limits by head enables the control processor to be adapted for each head disc combination. That is, as each new head is selected, a new set of control limits appropriate for the new head are loaded into a volatile memory of the servo engine thereby providing accurate, adaptive control.

As adjustments are needed to align a head to a data track, whether seeking to a new track or adjusting the head position to the data track during track following, specific servo control loop values must be determined and supplied to the control processor firmware for execution of the adjustments. The servo control loop values commonly result from performing arithmetic operations on sum-of-products type arguments. To perform the sum-of-products servo control loop value calculations, a preferred embodiment of the present invention provides a servo micro engine that includes a multiply-accumulate hardware core specifically constructed using a pipeline with stages for fetch, read, multiply, accumulate, and write-back to fully utilize all of the hardware during every clock cycle.

Although multiply-accumulate hardware is often available in a typical control processor, its performance is often limited by the ability to keep the multiply-accumulate hardware busy. Limited numbers of registers and limited memory bandwidth conspire to limit the throughput. Such processors also lacked sufficiently large multipliers, which limits the precision of the calculation, or impacts performance if extra precision is maintained. The inclusion by an embodiment of the multiply-accumulate hardware core of the present invention of ample registers, memory and large multipliers resolve the performance degradation issues associated with using multiply-accumulate hardware supported within typical control processors.

In addressing limitations of primary processor based multiply-accumulate hardware, the multiply-accumulate hardware core of the present invention has adequate precision and saturation capabilities and includes dedicated memory with sufficient memory bandwidth to keep the multiply-accumulate hardware core fed with data.

These and various other features and advantages which characterize the present invention will be apparent from a reading of the following detailed description and a review of the associated drawings.

DETAILED DESCRIPTION

Figure 1:
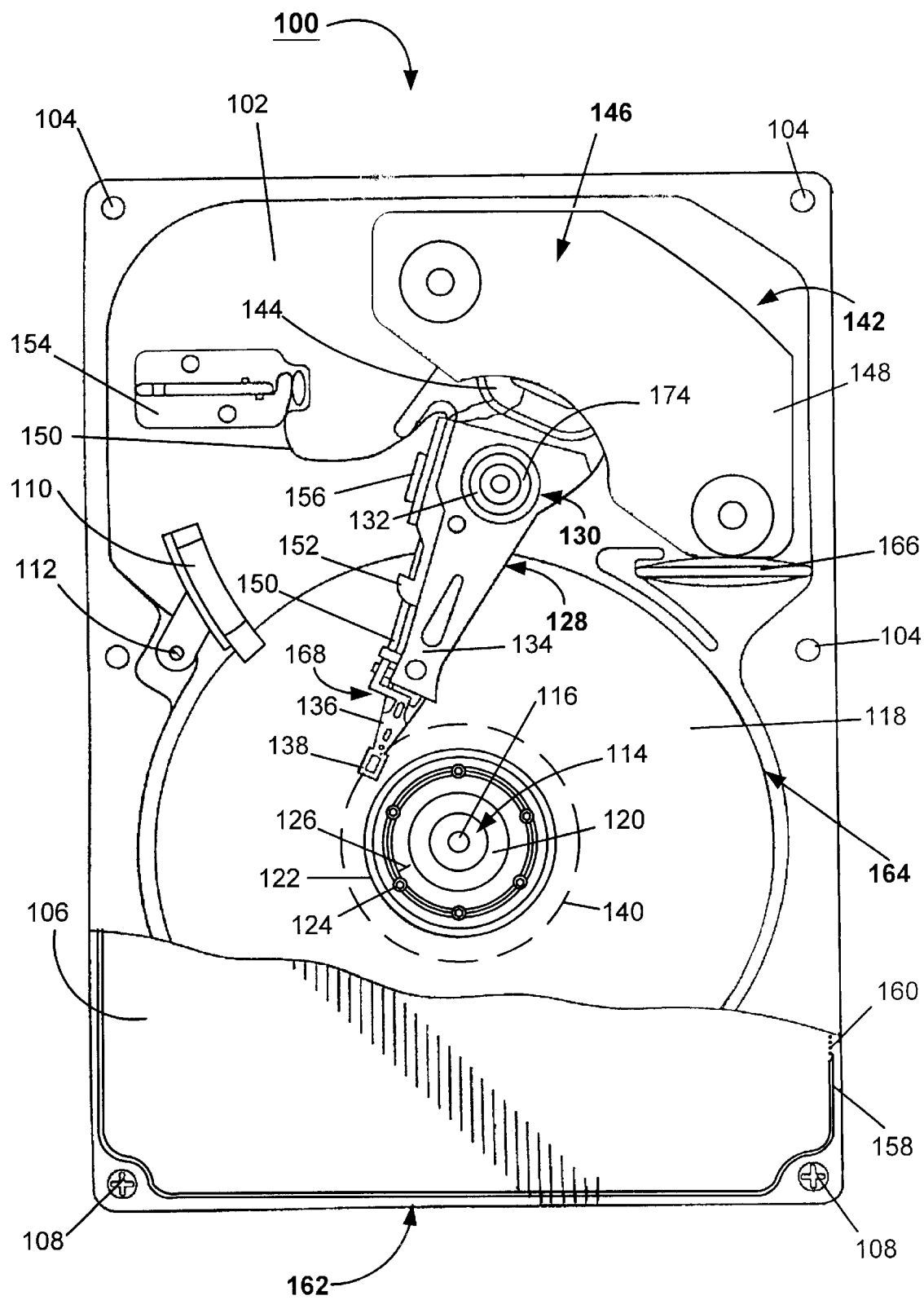
FIG. 1 is a top plan view of a disc drive incorporating a multiply-accumulate hardware core apparatus and method in accordance with preferred embodiments of the present invention.

Referring to the drawings in general, and more particularly to FIG. 1, shown therein is a top view of a disc drive 100 constructed in accordance with the present invention. The disc drive 100 includes a basedeck 102 that has several fastener receptacles 104, the basedeck 102 supporting various disc drive components, and a top cover 106 (shown in part), with several mounting apertures (not separately shown), secured to the basedeck 102 by top cover fasteners 108. The installed top cover 106 together with the basedeck 102 provides a sealed internal environment for the disc drive 100. Numerous details of and variations for the construction of the disc drive 100 are not included in the following description as such are well known to those skilled in the art and are believed to be unnecessary for the purpose of describing the present invention.

Mounted to the basedeck 102 is a ramp load snubber assembly 110 secured to the basedeck 102 by a fastener 112, and a spindle motor 114 with a top cover attachment aperture 116. The spindle motor 114 supports several axially aligned rotatable discs 118 for rotation at a constant high speed, the discs 118 mounted on a spindle motor hub 120 that are secured by a clampring 122 with clampring fasteners 124. In addition to providing support for the stacked discs 118, the spindle motor hub 120 also provides a timing mark 126 used during the assembly process to reference the angular location of a source of rotational imbalance. Adjacent the discs 118 is a dual stage actuator 128 (also referred to as an "E-block" or a head stack assembly (HSA)) which pivots about a bearing assembly 130 in a rotary fashion. The bearing assembly supports a beveled pick and place member 132 that serves as a tooling grip during assembly operations. The HSA 128 includes actuator arms 134 (only one shown) that support load arms 136. Each load arm 136 in turn supports read/write heads 138, with each of the read/write heads 138 corresponding to a surface of one of the discs 118. As mentioned, each of the discs 118 has a data recording surface divided into concentric circular data tracks 140 (only one shown), and the read/write heads 138 are positionably located over data tracks to read data from, or write data to, the tracks.

The HSA 128 is controllably positioned by a voice coil motor assembly (VCM) 142 (also referred to herein as a primary actuator motor 142), comprising an actuator coil 144 immersed in the magnetic field generated by a magnet assembly 146. A magnetically permeable flux path is provided by a steel plate 148 (also called a top pole piece) mounted above the actuator coil 144 to complete the magnetic circuit of the VCM 142.

When controlled DC current is passed through the actuator coil 144, an electromagnetic field is setup, which interacts with the magnetic circuit of the VCM 142 to cause the actuator coil 144 to move relative to the magnet assembly 146 in accordance with the well-known Lorentz relationship. As the actuator coil 144 moves, the HSA 128 pivots about the bearing assembly 130, causing the heads 138 to move over the surfaces of the discs 118 thereby allowing the heads 138 to interact with the data tracks 140 of the discs 118. When the disc drive 100 is turned off, the VCM 142 parks the HSA 128 on the ramp load snubber assembly 110 to avoid shock induced contact between the read/write heads 138 and the discs 118.

To provide the requisite electrical conduction paths between the read/write heads 138 and disc drive read/write circuitry (not shown), read/write head wires (not shown) are affixed to a read/write flex circuit 150. Next the read/write flex 150 is routed from the load arms 136 along the actuator arms 134 and into a flex circuit containment channel 152 and on to a flex connector body 154. The flex connector body 154 supports the flex circuit 150 during passage of the read/write flex circuit 150 through the basedeck 102 and into electrical communication a disc drive printed circuit board assembly (PCBA) (not shown) mounted to the underside of the basedeck 102. The flex circuit containment channel 152 also supports read/write signal circuitry including preamplifier/driver (preamp) 156 used to condition read/write signals passed between the read/write circuitry (not shown) and the read/write heads 138. The disc drive PCBA provides the disc drive read/write circuitry, which controls the operation of the heads 138, as well as other interface and control circuitry for the disc drive 100.

To maintain the sealed internal environment for the disc drive 100, a seal gasket 158 is molded on to the top cover 106. Top cover 106 has a multitude of gasket attachment apertures 160 through, which gasket material flows during the gasket molding process. A continuum of symmetrically formed gasket material is disposed on both the top and bottom surfaces of the top cover 106 and injected through the apertures 160. During the cure process, the gasket material injected into the gasket attachment apertures 160 bonds the portion of the seal gasket adjacent the top surface of the top cover 106 to the portion of the seal gasket adjacent the bottom portion of the top cover 106, thereby sealing the gasket attachment apertures 160 and forming the seal gasket 158. A gasket material found to be useful for this application is "Fluorel" by the 3M Company, and more specifically, 3M "Fluorel", FE-5621Q.

The disc drive 100 has two primary assemblies, the PCBA (not shown) and a head disc assembly (HDA) 162 attached to the PCBA. The HDA 162 typically contains the mechanically active assemblies and components of the disc drive 100. Typically included within the HDA 162 are the HSA 128, the VCM 142 and a disc stack 164 (also referred to as a disc pack) sustained within the sealed environment created when the top cover 106 supporting the seal gasket 158 is secured to the basedeck 102 by fasteners 108. The disc stack 164 is formed by stacking discs 118, interleaved with spacer rings (not shown), on the spindle hub 120 of the spindle motor 114 and securing the stack with the clampring 122 and fasteners 124.

During operation of the disc drive 100, spinning discs 118 generate airflow consistent with the direction of rotation of the spinning discs 118. To reduce chances of a catastrophic failure of the disc drive 100 caused by particulate contamination, an air filter 166 is provided within the HDA 162 to trap airborne particulate either present following assembly or generated during operation of the disc drive 100.

Within disc drive 100, the HSA 128 of the present invention is characterized as a "dual-stage" actuator in that the actuator has a primary actuator motor VCM 142, which provides coarse positional control, and an array of micro-actuator (MA) 168, also referred to as a piezo plant 168, which provide fine head position control. As described hereinabove Passing current through the VCM 142 causes the actuator coil 144 to move relative to the magnet assembly 146, which in turn pivots the HSA 128 about the bearing assembly 130, positioning all heads 138 simultaneously over the surfaces of the discs 118, resulting in each head 138 being positioned over a range of data tracks 140, thereby allowing the heads 138 to interact with the data tracks 140 of the discs 118.

Each MA 168 includes at least one piezo electric transducer member (not shown) that expand and contract in response to application of a piezoelectric transducer voltage (PZT voltage). Application of the PZT voltage causes the selected head 138 to move over a particular, selected track from the range of tracks. Control signals for the VCM 142 and the MA 168, and read/write signals for the heads 118, are passed between the HSA 128 and the disc drive PCB via a flex circuit assembly 150.

It will be understood that each load arm 136 is serviced by at least one MA 168 (and hence, one head 138). However, each load arm 136 may support a number of MA 168. Since it is contemplated that only one head 138 will be selected at a time to perform data transfer functions, on track or track follow servo control signals are generated for the VCM 142 and the appropriate MA 168 in order to carry out the desired servo control for the selected head; switching to a new head results in the use of a different MA 168 appropriate for the new head. Additionally, while executing requests for changes in head position, involving the selected head 138, a determination is made whether to engage the VCM 142 in conjunction with the MA 168, (causing all heads 138 to move relative to the disc 118) or to apply additional PZT voltage to the MA 168 to accomplish the head repositioning.

Each MA 168 operates within a range of capability in response to an application of PZT voltage. Absent an applied PZT voltage to the MA 168, the physical attributes of the MA 168 remain unchanged. The response of the MA 168 to an application of a PZT voltage is to expand in a predetermined planar direction. However, the capability of expansion of the MA 168 is bounded by the physical characteristics of the MA 168. Application of PZT voltage to the MA 168 to induce expansion beyond the maximum capabilities of the MA 168 results in no further dimensional change to the MA 168.

For a preferred embodiment utilizing a single MA 168 for each preload arm 136, the initial PZT voltage applied to the MA 168 is determined by the portion of the surface of the disc 118 being served by the MA 168.

Figure 2:
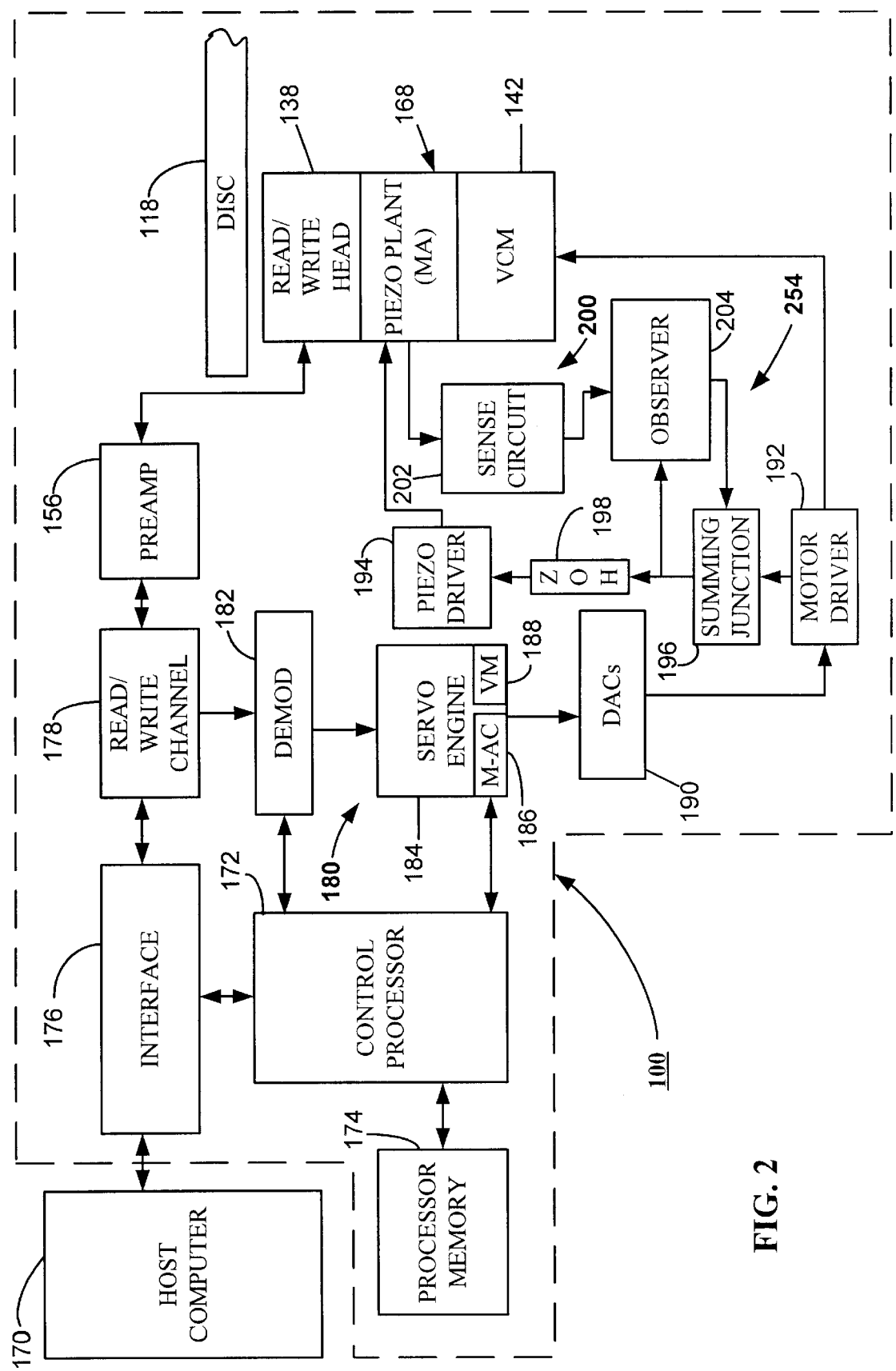
FIG. 2 is a functional block diagram of control circuitry of the disc drive of FIG. 1, including the multiply-accumulate hardware core that proves calculated servo control loop values to a control processor controlling an actuator of the disc drive of FIG. 1.

As the capabilities of each MA 168 and the VCM 142 are of importance in the implementation of the present invention, the techniques used in determining the capabilities of the VCM 142 and each MA 168, along with the circuitry of the PCB, will now be discussed with reference to FIG. 2. Command inputs from the host computer 170 initiates disc drive 100 response upon power up of the host computer 170. A programmable processing device, characterized as a control processor 172, provides top level control of the disc drive, including control of the HSA 120, in response to programming stored in processor memory (MEM) 174, including selection of a specific data track 140 or target data track 140 to be accessed in response to a seek request from the host computer 170.

Data are transferred between the host computer 170 and the discs 118 along a communication path including an interface circuit interface 176, read/write channel 178 and preamplifier/driver (preamp) 156. The preamp 156 is affixed to the read/write flex 150, as shown in FIG. 1.

HSA 128 positional control is provided by a primary or closed loop servo circuit 180 that includes a demodulator (demod) 182, an application specific integrated circuit (ASIC) hardware-based servo controller ("servo engine") 184 (which includes a DSP portion 186 and a volatile memory portion 188), a set of digital to analog converters (DACs) 190, a motor driver circuit 192, the VCM 142, the head 138, the preamplifier 156, and the read/write channel 178. The components of the closed loop servo circuit 180 discussed to this point are utilized to facilitate track following and seek functions for both the piezo plant 168 and the VCM 142.

The demodulator 182 conditions servo data transduced from the disc 118 to provide an indication of the position of the head 138 relative to a data track, also known as head position information. The servo engine 184 generates: command signals in the form of velocity based seek signals used by VCM 142; piezo plant input voltages or signals used in directing track following adjustments and responding to seek requests by the MA 168; and track following signals used by the VCM 142 to maintain HSA 128 position during data transfer. The command signals are converted by the DACs 190 to analog control signals for use by the motor driver 192 and a piezo driver 194.

The remaining components of the closed loop servo circuit 180 include a summing junction 196 and a zero-order hold device (ZOH) 198. These additional components, in conjunction with piezo driver 194, are used by the disc drive 100 to facilitate head positioning executed by the microactuator 168. Finally, a hysteresis correction circuit 200 (including a sense circuit 202 and an observer circuit [observer] 204) is incorporated as a component of the closed loop servo circuit 180. In drive operations, the sense circuit 202 of the hysteresis correction circuit 200 receives a resistance input from the piezo plant 168, and the observer 204 receives a piezo plant input voltage from the summing junction 196. The piezo plant input voltage received from the summing junction 196 represents the level of voltage the piezo driver 194 drives the piezo plant 168 to either bring the head 138 to track center or to facilitate extension or contraction of the piezo plant in response to a seek command.

The voltage driving the piezo plant 168 by the piezo driver 194 is a piezo inducement signal or voltage. In response to the voltage input from the piezo driver 194, the piezo plant 168 either expands or contracts its physical dimension and, in so doing, provides a change in resistance commensurate with the actual physical expansion or contraction of by the piezo plant 168. The sense circuit 202 responds to receipt of the resistance change by generating a displacement signal in the form of a sense circuit output voltage. The sense circuit output voltage is representative of a driving voltage the piezo plant 168 would have needed to effectuate the actual dimensional change had the piezo plant 168 responded to the driving voltage absent piezo plant hysteresis. In other words, if the piezo plant 168 were a device absent the effects of hysteresis, in response to a given voltage input, the piezo plant 168 would undergo a repeatable linear dimensional change. However, as a piezo plant 168 is susceptible to hysteresis and response to a given voltage input is not a linearly repeatable corresponding dimensional change in the piezo plant 168, corrective measures are employed.

Each piezo plant 168 has a theoretical linear relationship between voltage input and dimensional change that is specific to the material use and construction of the piezo plant. The sense circuit 202 is selected to generate an output voltage based on an actual dimensional change of the piezo plant 168 in responding to a given PZT voltage input. The output voltage generated by the sense circuit 202 equals the theoretical input voltage the piezo plant 168 should have used to effectuate the actual change in dimension of the piezo plant 168 in response to the applied PZT voltage input. The observer 204 generates an expected piezo plant response signal in the form of a voltage based on the piezo plant input voltage received from the summing junction 196. The expected piezo plant response voltage is calibrated to correlate to the theoretical dimensional change or expected microactuator motor dimensional change the piezo plant 168 should have encountered in response to the applied (PZT) voltage.

The observer 204 receives, as input, the output voltage generated by the sense circuit 202. The observer 204 compares the expected piezo plant response voltage to the actual piezo plant response voltage to determine whether the physical response of the piezo plant 168 corresponds to dimensional change the piezo plant 168 should have undergone based on the piezo plant input voltage received from the summing junction 196. If the observed dimensional change in the piezo plant 168 corresponds to the expected dimensional change in the piezo plant 168, the observer 204 does nothing to update the summing junction 196 with a piezo plant correction voltage. However, if the observer 204 detects a discontinuity in the observed dimensional change of the piezo plant 168 and the expected dimensional change in the piezo plant 168, the observer 204 dispatches the piezo plant correction voltage to the summing junction 196. Upon receipt of a correction voltage from the observer 204, the summing junction 196 combines the piezo plant correction voltage with the piezo plant input voltage and provides a corrected piezo plant input voltage. The voltage level of the corrected piezo plant input voltage facilitates the amount of dimensional correction the piezo plant 168 needs to undergo to attain the dimensional change indicative of the theoretical dimensional change corresponding to the original piezo plant input voltage to the summing junction 196.

In describing the overall operation of a preferred embodiment of the servo circuit 180, the demodulator 182 will serve as the entry point and, for discussion purposes, the disc drive 100 is taken to be engaged in data transfer functions between the host computer 170 and the disc 118 and that the disc drive 100 is an embedded servo type disc drive. Based on those conditions, the demodulator 182 conditions servo data transduced from the disc 118 to provide an indication of the position of the head 138 relative to the selected data track on the disc 118. The output of the demodulator 182 is input to the servo engine 184. The servo engine 184 utilizes the demodulator 182 input as a basis for determining the appropriate change in input current, if any, required by the VCM 142 and the input voltage, if any, required by the piezo plant 168 to maintain the head 138 at track center in a track following mode relative to the selected data track 140.

During track following mode, the servo engine 184 updates the input current, beyond the bias current, required by the VCM 142 and the input voltage, greater than or less than zero, required by the piezo plant 168 to maintain the positional relation of a head 138 relative to the selected data track 140 based on input updates from the demodulator 182. The demodulator 182 issues updates based on positional information received from the read/write channel 178. The read channel 178 receives positional information each time the head 138 encounters one of the embedded servo fields on the selected track.

If the input from the demodulator 182 reveals a need for a positional correction of the head 138, the servo engine 184 determines whether the required correction can be accomplished through utilization of the piezo plant 168 or needs an engagement of the VCM 142. To make this determination, the servo engine 184 calculates a voltage needed by the piezo plant 168 and the current needed by the VCM 142 to accomplish the positional correction. Next, the servo engine 184 applies the needed current to the VCM 142 and the voltage to the piezo plant 168. The piezo plant 168 responds to the input more quickly than does the VCM 142. With feedback from the hysteresis correction circuit 200, the piezo plant 168 pulls the head 138 to track center of the data track 140. As current is applied to the VCM 142, voltage driving the piezo plant 168 is reduced to zero at a rate commensurate with the VCM 142 achieving a current level just sufficient to offset actuator bias encountered by the HSA 128 at the data track 140.

During operation of the disc drive 100, when the servo engine 184 determines a positional adjustment of the head 138 is needed outside the range of the piezo plant 168, i.e., a seek command, the servo engine 184 communicates with the control processor 172, which in turn queries the processor memory 174 to obtain a seek profile to be executed by VCM 142 in facilitating the positional adjustment of the head 138. Under a VCM 142 executed seek, the control processor 172 communicates the appropriate seek profile to the servo engine 184, the servo engine 184 generates seek command signals which are converted by the DACs 190 for use by the motor driver 192 and the piezo driver 194. The motor driver 192 applies the seek command signals to the VCM 142 by passing controlled current through the actuator coil 144 of the VCM 142. When controlled current is passed through the actuator coil 144 the magnetic circuit of the VCM 142 causes the actuator coil 144 to move relative to the magnet assembly 146 pivoting the HSA 128 about the bearing assembly 130, causing the heads 138 to move over the surfaces of the discs 118.

Upon receipt of the piezo activation voltage from the zero-order hold device 198, the piezo driver 194 drives a constant piezo inducement voltage across the piezo plant 168 to facilitate a full extension or full contraction of the piezo plant 168 position, depending on the direction of the seek, on entering seek functions.

Simultaneously with generating seek command signals for the VCM 142, the DACs 190 communicate the converted command signals to the motor driver 192, which passes through the converted command signals to the summing junction 196. The summing junction 196 directs the converted command signal, or piezo plant input voltage, to the zero-order hold device 198 and the observer 204. The zero-order hold device 198 receives the piezo plant input voltage from the summing junction 196 and outputs a piezo activation voltage corresponding to the piezo plant input voltage and maintains the piezo activation voltage as an output until an update of the piezo plant input voltage is received from the summing junction 196.

With the read gate open during seek functions, upon interaction with the target data track 140, the head 138 first reads positional data located on the disc 118, passes the information through the preamp 156, the read/write channel 178, the demodulator 182 and into the control processor 172. The control processor 172 analyzes the data read to determine whether additional positional changes need to be made to the head 138. Any required adjustments needed to bring the head 138 on track are conveyed to the servo engine 184 and the servo engine 184 determines whether the adjustments are to be made by activation of the piezo plant 168 or through further seek functions. Once the control processor 172 determines that the head 138 is on track and ready to interchange data between the host computer 170 and disc 118, the control processor 172 relinquishes positional control of head 138 to the servo engine 184 and the servo engine 184 operates as described hereinabove.

Figure 3:
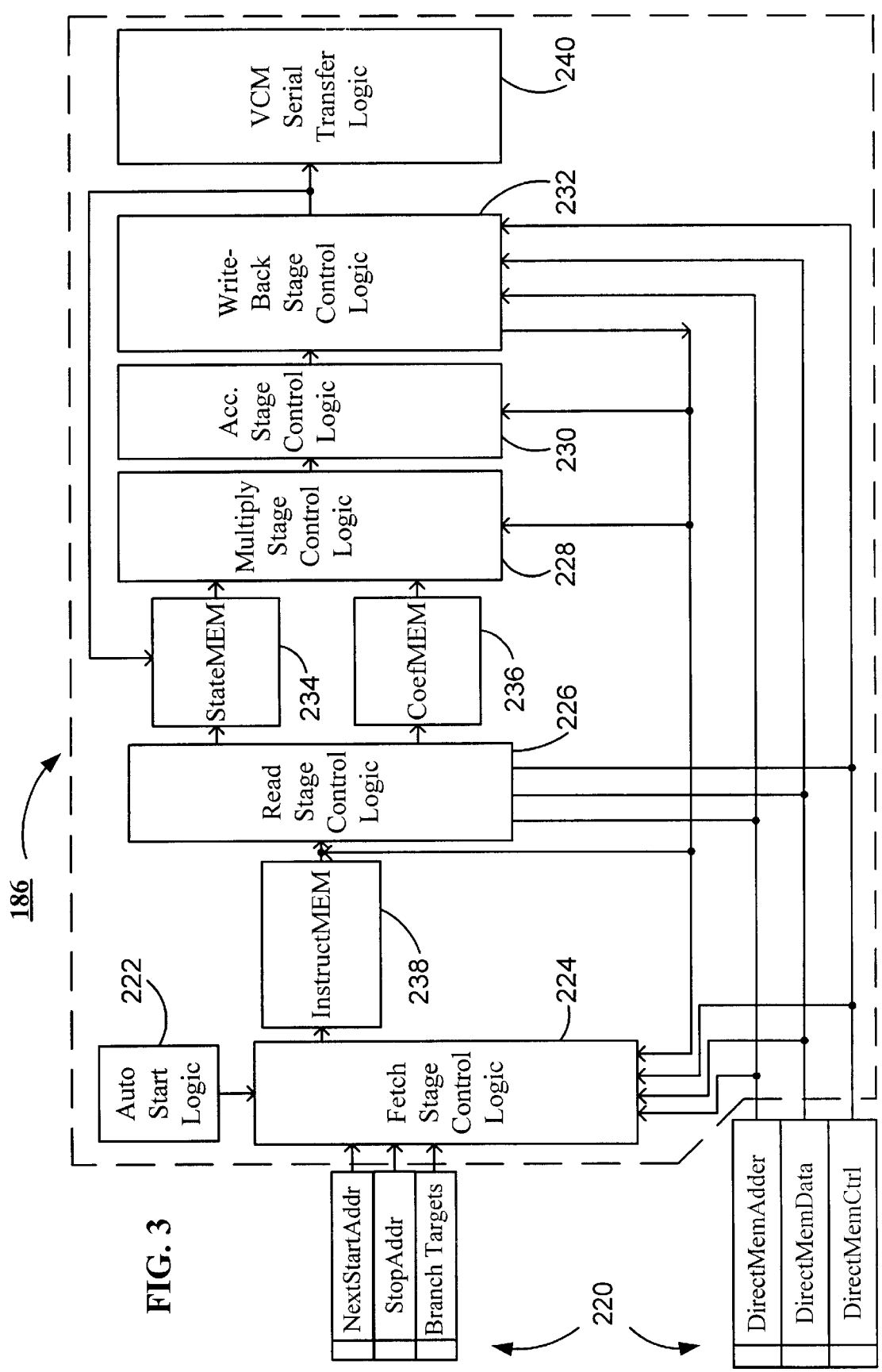
FIG. 3 shows a logic diagram of the multiply-accumulate hardware core of FIG. 2.

Control inputs 220 of FIG. 3 are provided by the control processor 172 to the multiply-accumulate hardware core 186. Auto start logic 222 initializes the multiply-accumulate hardware core 186 during power up of the disc drive 100 in response to the host computer 170 of FIG. 2 being powered on. The multiply-accumulate hardware core 186 uses a pipeline with fetch stage control logic 224, read stage control logic 226, multiply stage control logic 228, accumulate stage control logic 230, controlling four 64-bit accumulators, and write-back stage control logic 232 to fully utilize all of the hardware during every clock cycle of the disc drive 100. This results in the multiply-accumulate hardware core 186 performing one instruction fetch, four 32-bit operand fetches, two 32×32-bit multiplies, one 3×64 bit addition, three 64-bit shifts, and optionally, one 32-bit write-back to volatile memory and one 64 bit write to an accumulator every clock cycle of the disc drive 100. This is the rough equivalent to at least seven instructions of a 32-bit RISC processor and many more instructions for a processor with less powerful intrinsic arithmetic operations. Additionally, the control processor 172 is free to perform other computations.

During operation of the disc drive 100, the control processor 172 determines the specific form of the control loop algorithm requiring resolution by the multiply-accumulate hardware core 186. Implementation of a preferred embodiment of the present invention is centered on a multiply-accumulate hardware core capable of performing the following arithmetic operation:

$$ACC_{64} = [ACC_{64} + A_{32} * (B_{32} * 2^{N1})_{64} + C_{32} * (D_{32} * 2^{N2})_{64}] * 2^{N3} N1,$$
$$N2, N3 \ \{N3 \text{ includes sixteen different values from } -32 \text{ to } +32\}$$

Where A, B, C and D can be various combinations of states (S1, S2), coefficients (C1, C2) or other special values. S1 and S2 are 32-bit signed state variables, C1 and C2 are 24-bit signed coefficients, and the four accumulators ACC are a 64-bit signed value. All shifts, multiplies, and additions are subject to saturation.

Feeding this arithmetic core is a dedicated state memory 234, from which S1 and S2 are read and where the results may be optionally written. Another, independent, read only coefficient memory 236 provides C1 and C2. A final dedicated instruction memory 238 provides the addresses of the states and coefficients, provides the shifter control values N1, N2 and N3, in addition to other necessary control signals determined during the manufacturing process. Upon resolution of the control loop algorithm, the VCM serial transfer logic 240 transfers the resulting servo control loop value to the control processor 172. The control processor 172 develops the control signals necessary to activate the HSA 128, with the activation and calls the piezo plant 168 or the VCM 142.

Returning to FIG. 2, in a preferred embodiment each load arm 136 mounted piezo plant 168 is serviced by a separate hysteresis correction circuit 204 and controlled by a closed loop piezo servo circuit 254. The closed loop piezo servo circuit 254 is made up of the servo engine 184 (including the multiply-accumulate hardware core 186, the volatile memory 188 and the analog to digital converter 202), the control processor 172 (serving as a pass-through), the digital analog converters 190, the motor driver 192 (acting as a pass-through in the circuit), the summer 196, the zero-order hold device 198, the piezo driver 194, the voltage controlled amplifier 200 and the sense circuit 206 along with the observer 208 of the hysteresis correction circuit 204.

Utilizing the closed loop piezo servo circuit 254, when one of the heads 138 has been selected and is occupied with data transfer functions, the disc drive 100 retains the ability to simultaneously align each of the remaining heads 138 to track center of the data track corresponding to the data track 140 of the selected head 138, thereby forming a logical data cylinder transparent to the data transfer functions. The alignment of the heads 138 to track center of the corresponding data tracks 140 dose not necessarily result in the mechanical alignment of the heads 138, but does result in a logical data cylinder alignment of the heads 138. The logical data cylinder alignment of heads 138 facilitates improved data throughput rates by minimizing the need for seek corrections following head switches up-and-down a logical data cylinder.

To facilitate a logical data cylinder alignment of the heads 138 the voltage equivalent of head-to-head positional offset needs to be measured. During the manufacturing process each of the heads 138 is selected in turn and sequentially performes a seek to each data track 140. Once the selected head 138 is on track center of the selected data track 140 (for example, heads zero on track center at data track 1700 of surface zero), each of the remaining heads 138 will be sequentially brought on track, at track center of their corresponding data track 1700 by utilizing the closed loop piezo servo circuit 254. With all data heads 138 at track center of their corresponding data tracks 1700, a logical data cylinder 1700 is formed.

The voltage applied to the piezo plant 168 of the first selected head 118 is measured and recorded as a baseline. With the voltage applied to the piezo plant 168 of the first selected head 138 as a baseline, the voltage of each of the remaining piezo plants 168 is measured. The difference in voltage between the piezo plant 168 of the first selected head 138 and each of the remaining piezo plant heads 168 is calculated for each logical data cylinder and the resulting head-to-head alignment voltage differences are measured and stored in a head 138 accessible non-data region of the disc drive 100.

During disc drive startup the piezo plant 168 voltage value differences for each data cylinder is loaded in to volatile memory 188 for used during the operation of the disc drive 100. During operation of the disc drive when switching of heads 138 occurs in any given data cylinder, the final voltage level applied to the piezo plant 168 to bring the head 138 to track center, for the track selected by the head switch command will be measured and a new difference, if any, calculated and written to the volatile memory 188. During periods of time when the disc drive 100 is unoccupied by the host computer 170, the new voltage value differences will be written back to the head 138 accessible non-data region of the disc drive 100. It is further contemplated that during periods of time the disc drive 100 is unoccupied by the host computer 170, the disc drive 100 will undertake a process to sequential update the voltage differences for each of the logical cylinders within the disc drive 100, suspending the process on interrupt and resuming where it left off following service of the interrupt.

In addition to the head-to-head alignment voltage difference measurements, additional piezo plant 168 related measurements are made during the manufacturing process. Included among the measurements are: the maximum piezo inducement voltage; and track-to-track voltage differences between each of the data tracks 140 for each of the heads 138. The maximum piezo inducement voltage for each piezo plant 168 is determined by applying incremental increases in voltage across the piezo plant 168 and monitoring the change in voltage output of the sense circuit 206. When the sense circuit 206 voltage output ceases to change, the actual maximum voltage input the piezo plant 168 is capable of responding to has been found. As with the piezo plant 168 voltage value differences for each data cylinder, the maximum voltage input values for each of the piezo plants 168 are written to disc 118 in a head 138 accessible non-data region of the disc drive 100.

Track-to-track voltage differences are used by the disc drive 100 to facilitate single head seeks. In a preferred embodiment, the change in voltage applied to the piezo plant 168 to move a selected head 138 from track center of the selected track 140, to track center of an adjacent data track 140 is measured and recorded for each had track combination of disc drive 100. It should be noted that during the track-to-track voltage difference measurements, the hysteresis correction circuit is operative to ensure an accurate beginning voltage difference is captured.

In collecting the track-to-track voltage differences, the track spacing technology embodied by the disc drive 100 and the theoretical applied voltage to dimensional change relationship of the piezo plant 168 is utilized. Once the selected head 138 is on track center of the selected track, and the piezo plant 168 is within its maximum voltage level, the theoretical voltage level needed to expand or contract the piezo plant 168 sufficient to position the head 138 at track center of an adjacent track is applied to the piezo plant 168. The closed loop servo circuit 180 and the hysteresis correction circuit 204 are utilized to facilitate any corrections needed to bring the head 138 to its new track center. Once the head 138 is on track center of the newly selected data track, the voltage being applied to the piezo plant 168 is measured and the differences between the voltage applied to the piezo plant 168 for the prior selected track 140 and currently selected track 140 is calculated. As before, the track-to-track voltage differences are written to the disc 118 in a head 138 accessible non-data region of the disc drive 100.

During disc drive 100 startup, after the disc pack 164 attains its operating rotational speed, the head 138 reads the voltage equivalent of head-to-head positional offset measurements and the track-to-track voltage differences from the disc 118 and loads them into tables within the processor memory 174. Next, the maximum piezo inducement voltage levels are read and loaded into a table within the volatile memory 188. Once selection of the first head 138 and a first data track 140 is made, the head-to-head positional offsets for the selected cylinder and the track-to-track voltage differences for those tracks serviceable by the selected piezo plant 168 are read from the tables in the processor memory 174 and loaded into tables within the volatile memory 188.

During operation of the disc drive 100, actual track-to-track voltage differences for each of the piezo plants 168 encountered during the operation of the disc drive 100 are written to the volatile memory 188 and subsequently written back as an update to the head 138 accessible non-data region of the disc drive 100. During single heads seeks, the voltage level applied to the piezo plant 168 is determined by the sum of the track-to-track voltage differences of the data tracks 140 between the data track 140 the head 138 is servicing prior to the seek request and the data track 140 the head 138 is being requested to seek to.

As discussed hereinabove, to facilitate seeks executed by the VCM 142 during operation of the disc drive 100, the control processor DSP 172 queries the processor memory 174 to obtain the velocity seek profile, stored in the lookup table, to be executed by VCM 142 in facilitating the positional adjustment of the head 138. In establishing velocity seek profiles a servo engine adaptation routine is typically carried out during the disc drive 100 manufacturing operation that adapts the servo engine 184 to each head/disc combination. The disc drive 100 is typically placed in an appropriate computer-based workstation (not separately shown) and a first head 138 is selected. Next, a selected input spectrum is provided as an input to the VCM 142 and the MA 168 in order to obtain a plot of the corresponding output response (such as position variation). The input spectrum can comprise random noise, sinusoidal waveforms at incrementally higher frequencies ("swept sign"), etc. The output response information is gathered and provided to a control design routine which provides corresponding pre-calculated velocity seek profiles for each head disc combination as an output. The velocity seek profiles are then written to the disc 118 in a head 138 accessible non-data region of the disc drive 100. One suitable region for writing the velocity profiles, as well as the piezo plant 168 voltage values and differences is on a guard track or a number of guard tracks within the disc drive 100.

Figure 4:
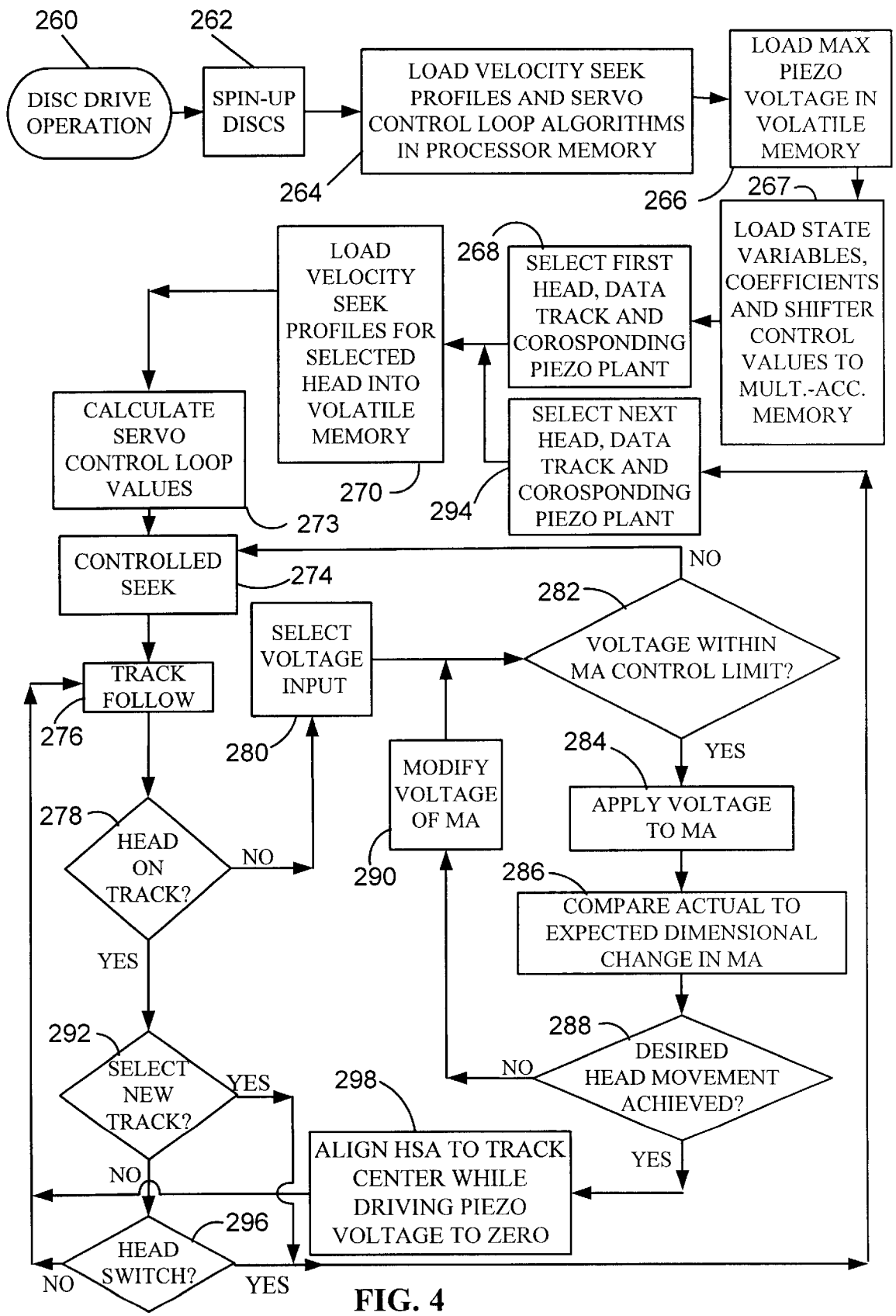
FIG. 4 provides a simplified block diagram showing the respective inputs and outputs of the servo engine of FIG. 2.

FIG. 4 provides a disc drive operation routine 260, and generally illustrates steps carried out during operation of the disc drive 100. Upon initialization (spin-up) at step 262 during which the drive is brought from a state of nonoperation to a state of operation, the measurement values taken during the manufacturing process and stored in a head 138 accessible non-data region of the disc drive 100 along with disc drive specific predetermined servo control loop algorithms are loaded into tables within the processor memory 174 at step 264, or into tables within the volatile memory 188 and step 266. At step 267, predetermined signed state variables, coefficients and shifter control values are loaded to multiply-accumulate memory portions of the multiply-accumulate hardware core 186. The signed state variables are written to the state memory portion 234, a volatile memory portion of the multiply-accumulate hardware core 186. The instruction memory 238 provides the addresses of the states and coefficients, provides the shifter control values N1, N2, and N3 and other known necessary control signals written to the instruction memory 238 resulting from step 267. And, in a preferred embodiment, coefficients C1 and C2 are constants stored in coefficient memory 236 wherein the coefficient memory 236 operates as a read-only memory during disc drive operations.

Next, based on the request from the host computer 170 to disc drive 100, the control processor selects the first head and corresponding piezo plant 168 and the first data track 140, as shown by step 268. Having selected the first head 138 and the first data track 140, the disc drive 100 loads the velocity seek profile for the selected head into the volatile memory 188 of the servo engine 184 as shown by step 270 (a memory section of servo engine 184 separate from the state memory portion 234, the coefficient memory 236 and instruction memory 238).

With the servo control values loaded into tables within the volatile memory 188, the control processor 172 selects the appropriate servo control loop algorithm and offloads the resolution of the selected algorithm to the multiply-accumulate hardware core 186 for calculation of the servo control loop values as shown in step 273. Following calculation of the servo control loop values, the disc drive 100 executes a velocity-controlled seek to the first selected track shown by step 274.

At the conclusion of the controlled seek of step 274, the closed loop servo circuit 180 enters the track following mode of process step 276. Having entered the process step 276, the first decision made by the servo system is to verify head 138 is on track as shown by decision step 278. If the selected head 138 is not on track center of the selected data track 140 the servo system enters process step 280 to determine a voltage value to be applied to the piezo plant 168 Having selected a voltage input for the piezo plant 168, the servo engine 184 checks the maximum voltage input the piezo plant 168 is capable of responding to. If the voltage to be applied to the piezo plant 168 is beyond the response capabilities of the piezo plant 168, the disc drive 100 initiates a new controlled seek at process step 274. However, if the voltage to be applied to the piezo plant 168 is within the capabilities of the piezo plant 168 the disc drive 100 directs the piezo driver 189 to apply the voltage to the piezo plant 168 in accordance with process step 284. In response to voltage applied to piezo plant 168, the strain gage 210 undergoes a change in resistance corresponding to a change in dimension experienced by the piezoelectric transducer member 210, the sense circuit 202 generates an output voltage corresponding to the actual dimensional change encountered by the piezoelectric transducer member 210 and in accordance with process step 286 the observer 204 makes a comparison between the actual dimensional change and the expected dimensional change of the piezo electric transducer 212.

The observer 204 then moves to decision step 288 and decides whether the dimensional change the piezo electric transducer 212 attained coincides with the expected dimensional change. If the dimensional change achieved by the piezoelectric transducer member 210 coincides with the expected dimensional change of the piezoelectric transducer member 210, the requested change in head position is deemed to having been achieved. The servo engine 184 of the disc drive 100 proceeds to HSA 128 alignment step 298. Completing process step 298, the servo engine 184 returns to the track follow mode of process step 276. If the dimensional change achieved the piezo electric transducer 212 fails to attain the expected dimensional change of the piezoelectric transducer member 210, the observer 204 provides a correction voltage to summing junction 196 to be used in process step 290 to modify the voltage of the piezo plant 168. This voltage application, verification and voltage reapplication mode of process steps 282 through 290 continues under the track following mode of the disc drive 100 through its low pass response transfer function and serves as a fine mode track following control system for the disc drive 100.

The VCM 142 provides the course track following for the disc drive 100 by maintaining the position of the coil 144 relative to the magnet assembly 146 and operating to bring the HSA 128 to "track center", i.e., bias offset current only, while the piezo plant driving voltage is brought to zero. When the requested head positional change has been achieved, the disc drive 100 continues in the track following mode process step 276 and proceeds to decision step 278. At decision step 278, if the head 138 is on track the disc drive 100 moves to decision step 292 looking for requests to seek to a new track. If such a request is present, the disc drive 100 reenters process step 294 and proceeds as describe hereinabove. If there are no requests to seek to a new track, the disc drive 100 moves to decision step 296 and checks for head switch requests. If no head switch requests are present, the disc drive 100 continues in the track following mode of process step 276. However, if a head switch requests is present the disc drive 100 moves to process step 296 and selects the next head 138, the next data track 140 and the piezo plant 168 corresponding to the newly selected head 138 and reenters the disc drive operation routine at process step 270.

The present invention provides several advantages over prior art. First, the inclusion of the multiply-accumulate hardware core 186 frees control processor 172 resources that can be applied to other disc drive 100 functions to improve the data transfer throughput. Second, the implementation of the multiply-accumulate hardware core into the servo micro engine 184 allows the closed loop piezo servo circuit such as 254 to run concurrently with data transfer operations, aiding sustained data throughput capabilities of the disc drive. Third, the adaptation of the multiply-accumulate hardware core into the disc drive brings with it the structure that provides servo control calculations for both seek and track follow servo control modes. This third advantage contributes to a more uniform approach in constructing servo code, making for more efficient product development cycles.

In summary, the present invention is directed to an apparatus and method for accelerating servo control calculations. In accordance with preferred embodiments, a disc drive such as 100 includes a dual stage actuator such as 128 having a primary actuator motor such as 142 and secondary actuator motors or microactuator motors such as 168, a closed loop servo circuit such as 180 including a hysteresis correction circuit such as 204 and a closed loop piezo servo circuit such as 24 controlling the primary and secondary actuator motors to maintain a head such as 118 adjacent a rotatable disc such as 108.

A demodulator such as 182 provides head position information and a control processor such as 172 provides target data track 140 information to a servo engine such as 184. The servo engine includes a multiply-accumulate to hardware core of such as 186 providing calculated servo loop control values used by the control processor in controlling the control modes of the dual stage actuator. The multiply-accumulate hardware core is specifically designed to perform sum-of-products terms common in servo control loop algorithms and has been found useful in calculations of sinusoids (sine/cosine tables) which could replace a fixed table used currently. Additionally, the multiply-accumulate hardware core of the present invention is capable of performing calculations of polynomial approximations permitting replacement of the existing velocity profile table for long seeks.

To facilitate resolution of the servo control loop algorithms, the multiply-accumulate hardware core includes and arithmetic core comprising: an auto start logic such as 222 that initializes the multiply-accumulate hardware core at disc drive power-up; fetch stage control logic such as 224 performing instruction and operand value fetches; read stage logic such has 226 reading direct memory adder, direct memory data and direct memory control inputs such as 220 provided to the multiply-accumulate hardware core by the control processor; multiply stage logic such as 228 performing multiplication operations on the servo control algorithm during calculation of the servo control loop values; an accumulate stage logic such as 230, including shift registers, performing additions and normalizing the results of the fixed point math through alignment of the binary point with remaining arguments; write-back stage control logic 232 providing operand values to the fetch stage logic, the read stage logic and results of arithmetic operation to a VCM serial transfer logic such as 240.

Feeding this arithmetic core is a dedicated state memory such as 234, from which a first signed servo state (S1) and a second signed servo state (S2) are read and where calculation results may be optionally written. Another, independent, coefficient memory such as 236 (operating a read-only memory in a preferred embodiment) provides predetermined coefficients used in resolving servo control loop algorithms. A final dedicated instruction memory such as 238, the shifter control values along with the addresses of the states and coefficients in addition to other necessary control signals.

A preferred embodiment implementation of the multiply-accumulate hardware core uses a pipeline with the stages for fetch, read, multiply, accumulate, and write-back to fully utilize all of the hardware during every clock cycle. This results in the multiply-accumulate hardware core performing one instruction fetch, four 32-bit operand fetches, two 32×32-bit multiplies, one 3×64 bit addition, three 64-bit shifts, and optionally, one 32-bit write-back to volatile memory and one 64 bit write to an accumulator every clock cycle of the disc drive 100.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for effecting control modes of an actuator of a disc drive comprising steps of:
    (a) initializing a multiply-accumulate hardware core comprising a hardware circuit configured to output servo control loop values for a plurality of servo control modes by loading control inputs for each of the servo control modes into the multiply-accumulate hardware core;
    (b) selecting an algorithm corresponding to a selected one of the plurality of different servo control modes based on head position and target head position via a control processor;
    (c) offloading the selected algorithm to the hardware core for resolution;
    (d) resolving the selected algorithm via the hardware core by applying the control inputs to the selected algorithm to generate the servo control loop values; and
    (e) providing the servo control loop values to the control processor to effect the selected control mode of the actuator.

2. The method of claim 1 in which the initializing step (a) control inputs comprise a first signed servo state variable, a second signed servo state value, a plurality of signed coefficient values and shifter control values, and in which loading the control inputs for each of the servo control modes into the multiply-accumulate hardware core comprises steps of:

(ai) writing the first signed servo state variable and the second signed state variable to a state memory portion of the multiply-accumulated hardware core;

(aii) recording signed coefficient values into a coefficient memory portion of the multiply-accumulate hardware; and (aiii) storing the shifter control values in an instruction memory portion of the multiply-accumulate hardware core.

3. The method of claim 1 in which the resolving step (d) comprises steps of:

(di) preforming an instruction fetch and a plurality of operand fetches using fetch stage control logic of the multiply-accumulate hardware core;

(dii) executing a plurality of multiplies and shifts using multiply stage control logic of the multiply-accumulate hardware core;

(diii) effectuating a plurality of sums utilizing accumulate stage control logic of the multiply-accumulate hardware core; and (div) generating a calculated servo control loop value for use by the control processor in effectuating the selected control mode.

4. The method of claim 1 in which the providing step (e) comprises steps of:

(ei) delivering a calculated servo control loop value to write-back stage control logic of the multiply-accumulate hardware core;

(eii) writing the calculated servo control loop value to VCM serial transfer logic of the multiply-accumulate hardware core using the write-back stage control logic; and (eiii) transferring the calculated servo control loop value to the control processor using the VCM serial transfer logic.

5. The method of claim 2 in which the shifter control values comprises shift register control values used by shift registers of the multiply stage control logic to normalize calculation results by aligning the binary point of the calculation results with the binary point of the remaining arguments.

6. The method of claim 2 in which the signed coefficients are disc drive dependent signed constants, the coefficient memory is nonvolatile memory and wherein the recording step (aiii) comprises storing signed constants in the non volatile memory.

7. The method of claim 6 in which the instruction memory providing the shifter control values, and addresses for the first signed servo state variable, the second signed servo state variable and the signed constants.

8. The method of claim 3 in which the method steps (di) through (div) are executed within one clock cycle of a clock signal used by the control processor.

9. The method of claim 1 in which the disc drive comprises:

a disc pack comprising at least one rotatable disc surface;

an actuator comprising:

a head supported by the dual stage actuator adjacent the disc surface; and a primary actuator motor providing coarse head placement control;

a servo micro engine comprising:

an analog to digital converter providing microactuator voltage data; and a volatile memory device providing voltage control input limits for microactuator control, wherein the multiply-accumulate hardware core is embedded in the servo micro engine to provide the generated servo control loop values to the process controller for effecting the selected control mode of the actuator.

10. The method of claim 9 in which the multiply-accumulate hardware core comprises an auto start logic initializing the multiply-accumulate hardware core at disc drive power on.

11. The method of claim 9 in which the instruction memory portion and the state memory portion are volatile memory portions and the coefficient memory portion is a nonvolatile memory portion.

12. The method of claim 10 in which the multiply-accumulate hardware core further comprises read stage control logic and write-back stage control logic, the write-back stage control logic reading input signals from the control processor and providing calculation results to the state memory portion, the VCM serial transfer logic, the accumulate stage control logic, the multiply stage control logic, the read stage control logic, and the fetch stage control logic.

13. A disc drive, comprising:

a disc pack comprising at least one rotatable disc;

a dual stage actuator comprising:

at least one head supported by the dual stage actuator adjacent a corresponding disc surface;

a primary actuator motor providing coarse head placement control; and a microactuator supported by the primary actuator providing fine head position control; and a servo micro engine comprising:

an analog to digital converter providing microactuator voltage data;

a volatile memory device providing voltage control input limits for microactuator control; and a multiply-accumulate hardware core to provide calculated servo loop control values for controlling the dual stage actuator.

14. The disc drive of claim 13 further comprising a control processor and wherein the multiply-accumulate hardware core comprises:

an auto start logic portion initializing the multiply-accumulate hardware core at disc drive power on;

a fetch stage control logic portion performing servo control loop algorithm instruction and operand value fetches;

an instruction memory portion storing instructions and shifter control values for processing servo control loop algorithms;

a multiply stage control logic portion performing multiplication functions including shifts in resolving the servo control loop algorithms;

an accumulate stage control logic portion performing sums in resolving the servo control loop algorithms; and a VCM serial transfer logic portion transferring calculated servo loop control values to the control processor.

15. The disc drive of claim 13 wherein the multiply-accumulate hardware core further comprises a state memory portion and a coefficient memory portion, wherein the instruction memory portion and the state memory portion are volatile memory portions and the coefficient memory portion is a nonvolatile memory portion.

16. The disc drive of claim 14 wherein the control processor provides input signals and wherein the multiply-accumulate hardware core further comprises a read stage control logic portion and a write-back stage control logic portion reading the input signals from the control processor and providing calculation results to the state memory portion, the VCM serial transfer logic, the accumulate stage control logic, the multiply stage control logic, the read stage control logic, and the fetch stage control logic.

17. The disc drive of claim 13 wherein providing the calculated servo loop control value comprises steps of:

(a) initializing a multiply-accumulate hardware core comprising a hardware circuit configured to output servo control loop values for a plurality of different servo control modes by loading control inputs for each of the servo control modes into the multiply-accumulate hardware core;

(b) selecting an algorithm corresponding to a selected one of the plurality of different servo control modes based on head position and target head position via a control processor;

(c) offloading the selected algorithm to the hardware core for resolution;

(d) resolving the selected algorithm via the hardware core by applying the control values to the selected algorithm to generate the servo control loop values; and (e) providing the servo control loop values to the control processor to effect the selected control mode of the actuator.

18. A disc drive comprising:

a control processor controlling an actuator; and means for generating and providing servo control loop values to the control processor to effect control modes of the actuator.

19. A disc drive comprising:

a control processor controlling an actuator; and a multiply-accumulate hardware core generating and providing servo control loop values to the control processor effecting control modes of the actuator, the multiply-accumulate hardware comprising:

an auto start logic portion initializing the multiply-accumulate hardware core at disc drive power on;

a fetch stage control logic portion performing servo control loop algorithm instruction and operand value fetches;

an instruction memory portion storing instructions and shifter control values for processing servo control loop algorithms;

a multiply stage control logic portion performing multiplication functions including shifts in resolving the servo control loop algorithms;

an accumulate stage control logic portion performing sums in resolving the servo control loop algorithms; and a VCM serial transfer logic portion transferring servo control loop algorithm results to the control processor.

20. The disc drive of claim 19 wherein the servo control loop algorithm results are generated in accordance with a method comprising steps of:

(a) initializing the multiply-accumulate hardware core of the disc drive;

(b) writing servo states variables, coefficients and shifter control values to memory blocks of the multiply-accumulate hardware core;

(c) providing head position and target data track information to the control processor;

(d) selecting a state specific servo control loop algorithm via the control processor;

(e) offloading the state specific servo control loop algorithm to the multiply-accumulate hardware core for resolution of the algorithm;

(f) calculating the servo control loop values by resolving the servo control loop algorithm for use by the control processor in controlling activities of the actuator; and (g) providing the calculated servo control loop values to the control processor for controlling the activities of the actuator of the disc drive.

21. A multiply-accumulate hardware core adapted to resolve servo control loop values comprising:

a multiply stage control logic portion to resolve servo control loop values; and an accumulate stage control logic portion to further resolve the servo control loop values.

22. The multiply-accumulate hardware core of claim 21, wherein the multiply-accumulate hardware core is included in a servo micro engine.

* * * * *